United States Patent
Ylonen et al.

(10) Patent No.: US 6,438,612 B1
(45) Date of Patent: Aug. 20, 2002

(54) METHOD AND ARRANGEMENT FOR SECURE TUNNELING OF DATA BETWEEN VIRTUAL ROUTERS

(75) Inventors: Tatu Ylonen; Tero Kivinen, both of Espoo (FI)

(73) Assignee: SSH Communications Security, Ltd., Espoo (FI)

( * ) Notice: Subject to any disclaimer, the term of this patent is extended or adjusted under 35 U.S.C. 154(b) by 0 days.

(21) Appl. No.: 09/151,744

(22) Filed: Sep. 11, 1998

(51) Int. Cl.[7] .................... G06F 15/16; G06F 15/173
(52) U.S. Cl. .................. 709/249; 709/229; 709/225; 713/201; 713/160; 713/150; 713/162; 707/10
(58) Field of Search ................................ 709/204, 223, 709/200, 224, 249, 238, 229, 225, 232; 713/200, 201, 160, 162, 161, 150, 153; 370/392, 397; 380/23; 707/9, 10

(56) References Cited

U.S. PATENT DOCUMENTS

| | | | | |
|---|---|---|---|---|
| 5,550,816 A | * | 8/1996 | Hardwick et al. | 370/397 |
| 5,892,912 A | * | 4/1999 | Suzuki et al. | 709/218 |
| 5,898,784 A | * | 4/1999 | Kirby et al. | 380/49 |
| 5,959,990 A | * | 9/1999 | Frantz et al. | 370/392 |
| 5,968,176 A | * | 10/1999 | Nessett et al. | 713/201 |
| 5,983,350 A | * | 11/1999 | Minear et al. | 709/225 |
| 6,006,259 A | * | 12/1999 | Adelman et al. | 709/223 |
| 6,047,330 A | * | 4/2000 | Stracke, Jr. | 709/238 |
| 6,049,878 A | * | 4/2000 | Caronni et al. | 713/201 |
| 6,085,238 A | * | 7/2000 | Yuasa et al. | 709/223 |
| 6,157,649 A | * | 12/2000 | Peirce et al. | 370/401 |
| 6,182,226 B1 | * | 1/2001 | Reid et al. | 709/225 |
| 6,202,081 B1 | * | 3/2001 | Naudus | 370/401 |
| 6,269,404 B1 | * | 7/2001 | Hart et al. | 709/238 |
| 6,304,973 B1 | * | 10/2001 | Williams | 713/153 |

\* cited by examiner

Primary Examiner—Mark H. Rinehart
Assistant Examiner—William C Vaughn, Jr.
(74) Attorney, Agent, or Firm—Ronald Craig Fish; Ronald Craig Fish, A Law Corporation

(57) ABSTRACT

Data packets are communicated between a transmitting virtual router in a transmitting computer device and a receiving virtual router in a receiving computer device. A security association is established for the secure transmission of data packets between the transmitting computer device and the receiving computer device. The transmitting virtual router and the receiving virtual router are identified within said security association. In the transmitting computer device, the security association for processing a data packet coming from the transmitting virtual router is selected on the basis of the identification of the transmitting virtual router within the security association. In the receiving computer device, the security association for processing a data packet coming from the transmitting computer device is selected on the basis of values contained within the data packet. In the receiving computer device, the data packet processed within the security association is directed to the receiving virtual router on the basis of the identification of the receiving virtual router within the security association.

16 Claims, 4 Drawing Sheets

METHOD AND ARRANGEMENT FOR SECURE TUNNELING OF DATA BETWEEN VIRTUAL ROUTERS

TECHNICAL FIELD

The invention concerns generally the field of transmitting data in the form of packets between computers in a network. Especially the invention concerns the secure transmission of data packets in a network comprising so-called virtual routers.

BACKGROUND OF THE INVENTION

A network is an arbitrary aggregate of computer devices linked together through wire, cable, fibre and/or wireless connections for transmitting data in the form of packets. The computer devices in a network may be classified to hosts and routers. A host is a computer device in a network arranged to process packets destined to itself, whereas a router is arranged to process packets both to itself and packets destined to other computer devices of the network. Routers may further be sub-classified; some sub-classes are for example IP routers (Internet Protocol) and access routers. The present invention concerns generally the operation of routers, but it has implications also to the operation of other computer devices in a network.

A simple router 100, illustrated in FIG. 1a, has a number of input lines 101, a number of output lines 102 (which may physically be the same as the input lines) and a routing processor 103 capable of taking the packets coming on the input lines and forwarding them to the correct output lines in accordance with some explicit or implicit information about the destination of the packets. In the usual case the router has previously stored routing tables that dictate the correct handling of packets. Explicit information above means that each packet contains information about how it should be processed, and implicit information means that from a certain context the router knows how to handle the packet. The router may have obtained the necessary implicit knowledge from some previous packets, or each packet may have a context identifier revealing the correct context.

Recently, the concept of virtual routers has been introduced, as in FIG. 1b. A virtual router 110, 111 or 112 is a logical concept instead of a physical one. A single physical computing device 113 in a network may house a number of virtual routers that use the same hardware, i.e. the same physical input lines 114 and output lines 115 (which may again physically be the same as the input lines) and the same processor 116. Conceptually the virtual routers are separate entities, and a suitable multiple access scheme is applied to share the common physical resources between them. It is even possible to construct a virtual network where the connections between hosts go through virtual routers. Multiple virtual networks may rely on the same cabling and the same physical routers without having any knowledge of each other. This is a popular way of implementing virtual private networks or VPNs, each of which can serve for example as the backbone network connecting the branch offices of a large company together.

Instead of a simple cable, two mutually communicating physical routers supporting virtual routers may also be connected by an arbitrarily complex network capable of transmitting data between its nodes. Such a network may contain intermediate routers that may or may not be aware of the multiple virtual networks going through them. There may be numerous physical (possibly routed) paths between any two nodes in the network. The paths may include wireline, cable, fibre and/or wireless segments.

Virtual networks raise a problem in packet labeling, because in the known labeling schemes it is difficult to identify the virtual network to which the packet belongs. In FIG. 2a, a typical data packet 200 comprises a header 201, a payload or data portion 202 and possibly a checksum 203 (CRC; Cyclic Redundancy Check). The header 201 is arranged into fields that contain, among other information, a source address (not separately shown) identifying the sender of the packet and a destination address (not separately shown) identifying the intended recipient of the packet. As such, the packet can only traverse the logical network in which the addresses are valid, i.e. where the network addressing scheme enables the correct recognition of the sender and the intended recipient. It is possible to temporarily transmit the packet over a different logical network, but the packet must be suitably encapsulated and relabeled.

The process of encapsulating data packets for transmission over a different logical network is called tunneling. Typically, in the case of the IP protocol, tunneling involves adding a new IP header in front of the original packet, setting the protocol field in the new header appropriately, and sending the packet to the desired destination (endpoint of the tunnel). Tunneling may also be implemented by modifying the original packet header fields or replacing them with a different header, as long as a sufficient amount of information about the original packet is saved in the process so that it will be possible to reconstruct the packet at the end of the tunnel into a form sufficiently similar to the original packet entering the tunnel. The exact amount of information that needs to be passed with the packet depends on the network protocols, and information may be passed either explicitly (as part of the tunnelled packet) or implicitly (by the context, as determined e.g. by previously transmitted packets or a context identifier in the tunneled packet).

In the case of tunneling IP traffic between routers over a single network cable or an arbitrarily complex network, a packet is typically wrapped in an outer IP header. The outer source IP address is set to the IP address of the sending node, the outer destination IP address is set to the IP address of the endpoint of the tunnel, and the outer protocol identifier is set to identify the tunneling method. However, if the next router is a virtual router, this simple scheme is not necessarily applicable, because virtual routers typically do not have an IP address of their own. It is not practical to assign a separate IP address to each virtual router, because the number of virtual routers is expected to become very large (there may be hundreds of virtual routers in a single physical computing device) and the number of available IP addresses is limited. Extending the available IP address space by making the IP addresses longer is also not reasonable because it would require a protocol update in millions of computing stations around the world.

Multi-protocol label switching MPLS (as discussed in the Internet Engineering Task Force IETF working groups) can be used to carry labels that identify the virtual network that the packets belong to. Alternatively, the L2TP protocol (also discussed in IETF working groups) can be used to tunnel PPP (point-to-point protocol) streams over networks, and can also be used to carry labeling information.

Problems with virtual routers arise also in the context of security mechanisms introduced to enhance the security of data traffic in public networks. The IETF (Internet Engineering Task Force) has defined a set of rules for adding security to the IP protocol and collected them under the designation IPSEC or IP security protocol. IPSEC provides cryptographic authentication and confidentiality of traffic between two communicating network nodes. It can be used in both end-to-end mode, directly between the communicating nodes or hosts, or in tunnel mode between firewalls or routers. Asymmetric connections, where one end is a host and the other end is a firewall or router are also possible. The most important RFC standards published by the IETF and relating to IPSEC are RFC-1825 "Security Architecture for the Internet Protocol", RFC-1826 "IP Authentication Header" and RFC-1827 IP Encapsulating Security Payload (ESP)", all by R. Atkinson, NRL, August 1995, all of which are hereby incorporated by reference. RFC stands for Request For Comments, which is an IETF form of standards and recommendations. A complete overview of IPSEC is available to the public at the time of filing of, this patent application at the internet address www.tcm.hut.fi/Tutkimus/IPSEC/ipsec.html.

IPSEC performs authentication and encryption on packet level by generating a new IP header, adding an Authentication Header (AH) or Encapsulating Security Payload (ESP) header in front of the packet. The original packet is cryptographically authenticated and optionally encrypted. The method used to authenticate and possibly encrypt a packet is identified by a security parameter index (SPI) value stored in the AH and ESP headers. The SPI is a 32-bit integer. Its value is usually pseudo-random, but negotiated and known to the two endpoints of the tunnel. The AH header is illustrated in FIG. 2b, where the column numbers correspond to bits. The fields of the known AH header are as follows: Next Header 211, Length 212, Reserved 213, Security Parameter Index 214 and Authentication Data 215. The length of the last field 215 is a variable number of 32-bit words.

The Encapsulating Security Payload (ESP) may appear anywhere in an IP packet after the IP header and before the final transport-layer protocol. ESP consists of an unencrypted header followed by encrypted data. The encrypted data includes both the protected ESP header fields and the protected user data, which is either an entire IP datagram or an upper-layer protocol frame (e.g., TCP or UDP). A high-level diagram of an exemplary secure IP datagram is illustrated in FIG. 2c, where the fields are IP Header 221, optional other IP headers 222, ESP header 223 and encrypted data 224. FIG. 2c also illustrates the two parts of the ESP header, which are the 32-bit Security Association Identifier (SPI) 223a and the Opaque Transform Data field 223b, whose length is variable. No virtual router identifier is carried as part of the IPSEC protocol.

SUMMARY OF THE INVENTION

It is an object of the present invention to present a method and an arrangement for enabling the identification of virtual networks and/or virtual routers in the course of tunneling data packets through a network. It is a further object of the invention that it is applicable in the course of secure tunneling of data between virtual routers irrespective of the actual method of implementing the packet authentication and/or encryption.

The objects of the invention are achieved by connecting a destination virtual router identity to the security association governing the handling of packets, so that a separate security association is used to send packets to each virtual router at the physical computing device identified by a certain network address.

It is characteristic to the method according to the invention that it comprises the steps of a) establishing a security association for the secure transmission of data packets between the transmitting computer device and the receiving computer device, b) identifying the transmitting virtual router and the receiving virtual router within said security association, c) in the transmitting computer device, using the identification of the transmitting virtual router within the security association in the selection of the security association for processing a data packet coming from the transmitting virtual router, d) in the receiving computer device, selecting the security association for processing a data packet coming from the transmitting computer device on the basis of values contained within the data packet, and e) in the receiving computer device, directing the data packet processed within the security association to the receiving virtual router on the basis of the identification of the receiving virtual router within the security association.

The invention also applies to a method for transmitting data packets in a transmitting computer device, as well as to a method for receiving data packets in a receiving computer device. The transmitting method comprises the characteristic features a), b) and c) given above, and the receiving method comprises the characteristic features a), b), d) and e) given above.

Additionally the invention applies to a networked computer device for securely processing transmittable data packets. As features characteristic to the invention it comprises a number of virtual routers, means for establishing a security association for the secure transmission of data packets between the computer device and some other networked computer device, means for identifying a certain virtual router to be used in association with an established security association, and means for associating a piece of information identifying said certain virtual router with said established security association.

The invention relies on the concept of security association, which is a reserved term in the context of one specific protocol, but which can easily be generalised to cover all arrangements having similar features regardless of the actual protocol that is used. The specific protocol referred to above is the IKE or Internet Key Exchange protocol, which was previously known as the ISAKMP/Oakley, where the acronym ISAKMP comes from Internet Security Association Key Management Protocol. It defines a method for authenticating the communicating parties to each other, deriving a shared secret known only to the communicating parties, negotiating authentication and encryption methods to be used for the communication, and agreeing on a security parameter index (SPI) value and a set of selectors to be used for the communication. The IKE protocol will be published in the form of an RFC standard, but at the filing date of the present patent application it is already available to the public at the internet address ftp://ftp.nordu.net/internet-drafts/draft-ietf-ipsec-isakmp-oakley 08.txt which is hereby incorporated by reference.

According to the IKE protocol, the result of a negotiation between the communicating parties is one or more security associations or SAs. A security association specifies a set of selectors that indicate which packets the SA should be applied to, the type of the transformation applied to protect the packets (e.g. AH or ESP), the SPI, the encryption and/or authentication methods to apply, and the tunneling method and tunnel destination. The invention adds at least one new selector to a security association: the virtual network identifier. In some embodiments of the invention there are at least two new selectors to be added to the security association: the source virtual router identifier and the destination virtual router identifier. Additional selectors may be added according to need. The added selector(s) may be represented explicitly (e.g. as integers identifying the virtual network) or implicitly (e.g. by the queues and memory addresses in which the packet is stored and the routing tables by which it is processed). Advantageously the added selector(s) do(es) not form part of the actual data packet, but represent(s) information associated with the packet within a computing system.

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1a to 2c were discussed previously in the description of prior art, so in the following we will concentrate on FIGS. 3 to 7.

FIG. 3 illustrates a part of a network comprising a transmitting device 301, a receiving device 302 and a two-way connection 303 for transmitting data packets between the two. The invention does not limit the type of the devices 301 and 302; they may basically be hosts, routers, firewalls or other computer devices connected to the network, and they may be both of the same type or they may be of different types. However, because the invention concerns specifically the tunneling of packets in a network containing virtual routers, we must assume that at least one of the devices 301 and 302 is a virtual router. For the sake of example we will assume in the following that they are both virtual routers. The invention does not require that the two-way connection 303 is a simple cable connection. It may be even a complex network comprising a large number of intermediate routers and a variety of wireline, cable, fibre or wireless connection segments.

Figure 1A:
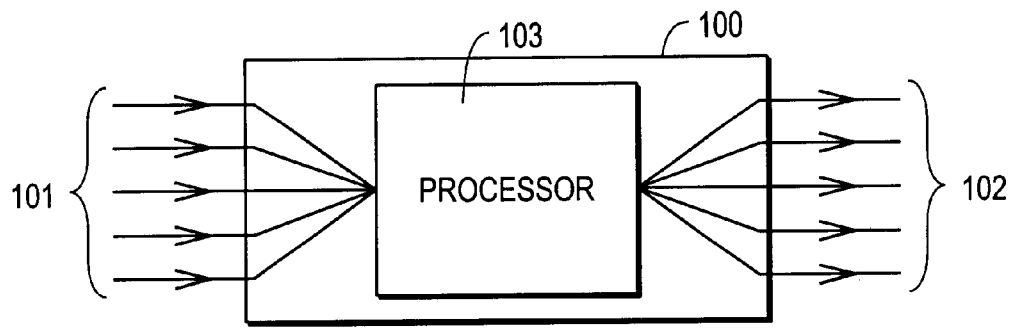
FIG. 1A depicts a known router.
Figure 1B:
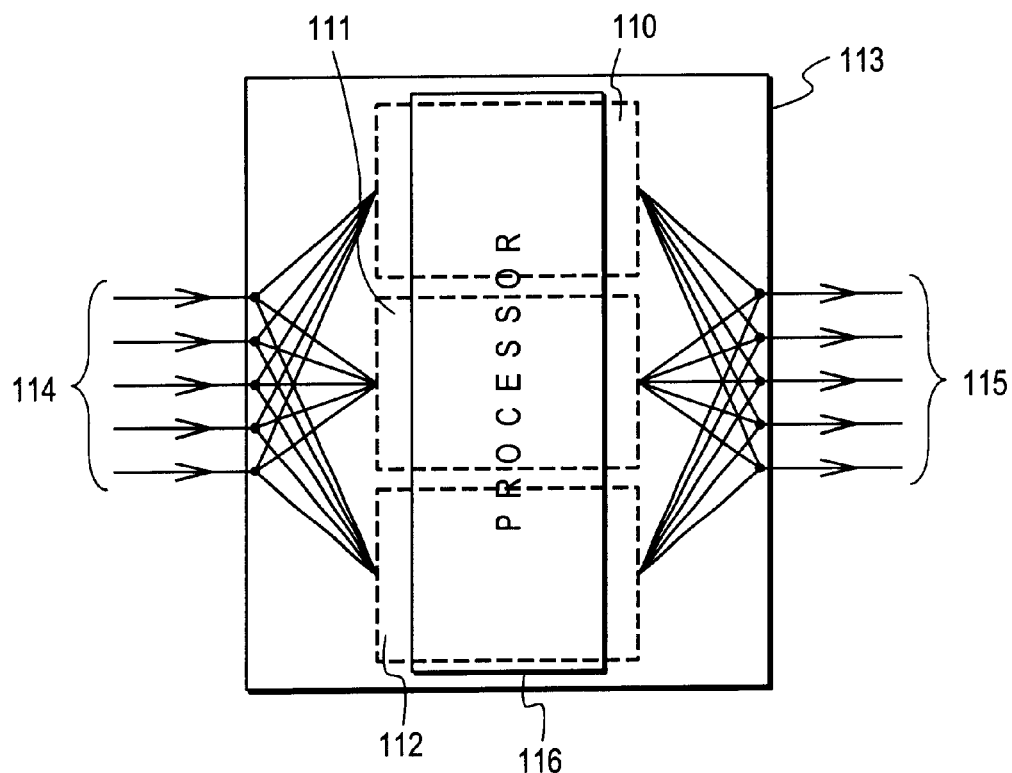
FIG. 1B illustrates the known concept of virtual routers.
Figure 2A:
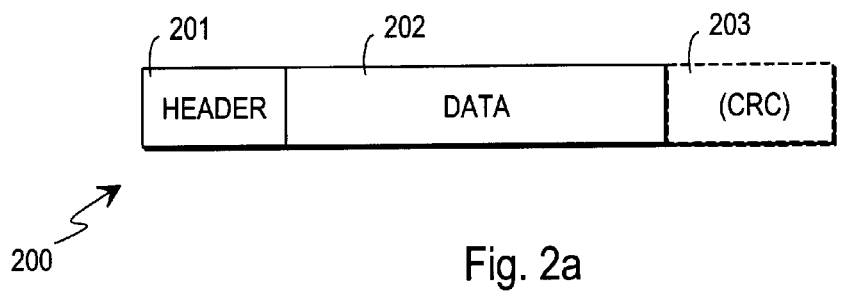
FIGS. 2a to 2c illustrate some known aspects of data packets.
Figure 2B:
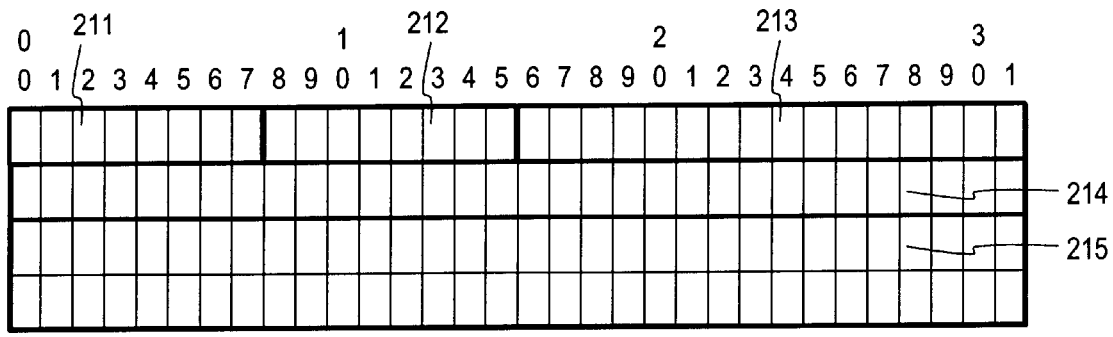
Figure 2C:
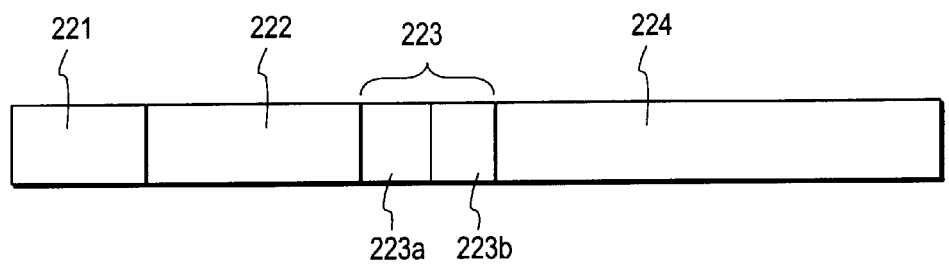
Figure 3:
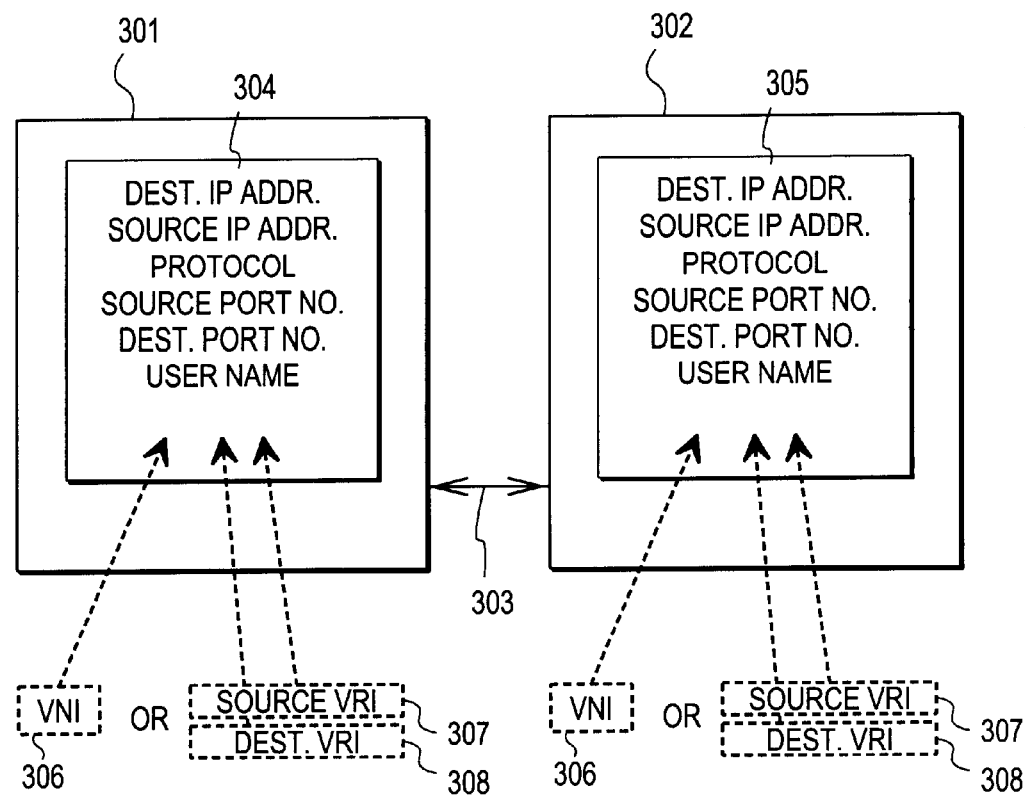
FIG. 3 illustrates the setup of a security association.

For the invention to be applicable we will assume that some arbitrary protocol exists for setting up a context for securely tunneling data packets from the transmitting device 301 through the connection 303 to the receiving device 302. As an example we will consider the IKE and IPSEC protocols mentioned previously. Setting up said context will then correspond to having a negotiation between the two devices, during which negotiation they will first authenticate themselves to each other and thereafter agree upon a shared secret, an authentication and/or encryption method to be used for the communication and on a security parameter index (SPI) value. The results of the negotiation will be locally stored at both devices, which is illustrated in FIG. 3 with the schematic memory blocks 304 and 305. There are also architectures where the results of the negotiation will be stored on a separate processor or in a separate central management station.

The negotiation will additionally result in a set of selectors to be used for the communication. The selectors typically specify which packets between the two communicating nodes should go into the tunnel. The IPSEC protocol specifies the following set of selectors: destination IP address, source IP address, protocol, source port number, destination port number, and user name. These selectors are also seen in memory blocks 304 and 305.

According to the present invention, at least one additional selector is agreed upon during the negotiation between the devices 301 and 302. A first advantageous embodiment of the invention is based on identifying each virtual network by a Virtual Network Identifier or VNI. Each physical computer device that comprises virtual routers will associate the VNI with one of its virtual routers. To identify a particular virtual router one would then need to know the network address(es) of the physical computer device and the virtual network identifier. In this first embodiment of the invention it suffices to add into the list of agreed selectors a VNI selector 306.

According to a second advantageous embodiment of the invention each physical computer device that comprises virtual routers will individually assign an unambiguous identifier to each of its virtual routers. Here "individually" means that a first physical computer device may assign a identifier XX to one of its virtual routers and a second computer device may assign a different identifier YY to one of its virtual routers even if the virtual routers XX and YY take part in the same virtual network. Naturally the identifiers for the virtual routers are also allowed to be the same (XX=YY). In this alternative identification scheme identifying a particular virtual router is equal to knowing, in addition to the network address(es) of the physical computer device, the virtual router identifier or VRI given internally within said physical computer device. Because both virtual routers 301 and 302 may have a different VRI, in this second embodiment of the invention it is most advantageous to add into the list of agreed selectors a source VRI selector 307 and a destination VRI selector 308.

The first and second embodiments of the invention described above both have their tradeoffs for configuration, management, and implementation. The choice between them may be affected by engineering decisions, standards, and other factors.

It is important to notice that even if the VNI or VRI is a property of every packet transmitted through a physical router implementing virtual routers, the invention does not require it to be a part of the actual data packet like e.g. destination addresses. It may be a piece of information conceptually associated with the packet within a computing system but not stored as part of the packet, approximately in a same way as user names.

Using the language of the IKE and IPSEC protocols, the result of the negotiation between the devices 301 and 302 is a security association (or a well-defined group of security associations). Because the VNI or VRI are selectors resembling the other selectors agreed upon during the setup of the security association, they may be represented explicitly (e.g. as an integer identifying the virtual network) or implicitly (e.g. by the queues and memory addresses in which the packet is stored and the routing tables by which it is processed).

In the previous discussion we have assumed that the security association is set up through an automatic negotiation between the communicating devices. In such case the invention requires the definition of at least one new selector within the protocol governing the automatic negotiation. The value for the new selector(s) will then be supplied during the negotiation just as for any other selectors, although their supplying will potentially require a straightforward extension of the existing standards; however, the technical implementation of such an extension is well within the capabilities of a person skilled in the art. It is also possible to configure the security association manually through operator action. Both the automatic negotiation and the manual configuration are processes known as such to the person skilled in the art. Regardless of the configuration method a typical value for the new selector(s) is an integer encoded as octets.

Figure 4:
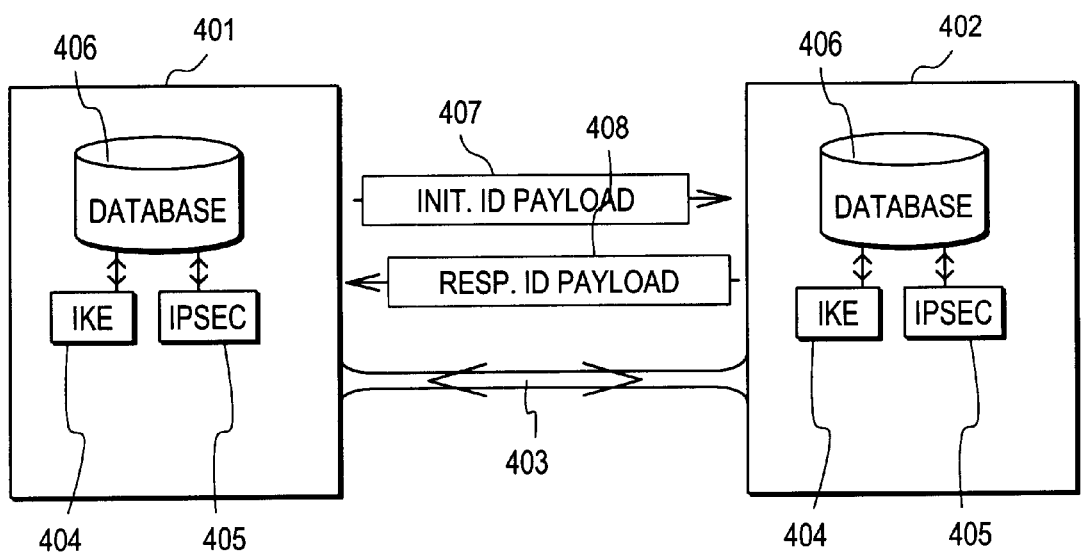
FIG. 4 is a schematic drawing of two communicating computer devices.

FIG. 4 is a slightly more detailed view of a transmitting device 401, a receiving device 402 and two-way communication connection 403 between them. Both the transmitting device 401 and the receiving device 402 have an automatic key manager block 404 and an IPSEC block 405 that communicate with a security policy database 406. We may keep the previously made assumption that the automatic key manager blocks 404 apply the IKE protocol for setting up the security association. To this end the automatic key manager block of the transmitting device 401 lists the value(s) of the new selector(s) according to the invention (the VNI or the VRIs) as a part of its phase 2 (Quick Mode) initiator ID payload 407. The automatic key manager block of the receiving device 402 then looks for a previously stored policy for that particular value or those particular values of the new selector(s), and uses the policy it finds or some newly constructed policy for further IPSEC processing. In its response, the key manager block of the receiving device 402 lists the same value(s) of the new selector(s) as a part of its responder ID payload 408.

A router supporting virtual routers may have the option of rejecting any negotiations that do not specify a virtual router. The above explained procedure of using the initiator and responder ID payloads as carriers for the value(s) of the new selector(s) according to the invention is to be seen as an example only; the person skilled in the art is capable of presenting also other methods for exchanging the mentioned values between the communicating parties.

Once the negotiation between the automatic key managers 404 is complete and the new security association is set up, both the transmitting device and the receiving device enter the information describing the security association into their security policy database. The stored information is then used for the processing of individual packets. For example if the first embodiment of the invention is used with a single VNI identifying all the virtual routers taking part in a certain virtual network, the IPSEC block of the transmitting device may apply the following rule: For an outgoing packet to be processed by a security association, it must be coming from the virtual router within the transmitting device identified by the negotiated VNI. One advantageous way of selecting a security association for the processing of a packet has been described in a co pending US patent application of the same applicant with the title "Method and Arrangement for Implementing IPSEC Policy Management using Filter Code". Other possible ways include the use of hash tables or lists of policy rules.

Generally when a receiving device 402 receives a packet protected using IPSEC, the receiving device selects the appropriate security association using the destination address, protocol (AH/ESP), and the SPI value indicated in the packet. IPSEC processing is then applied to the packet as specified by the security association. According to the invention when the packet leaves IPSEC processing, a check is made to see whether the security association specifies a VNI. If it does, the packet is internally (explicitly or implicitly) labelled as destined to the virtual router identified by that identifier within the receiving device, and is only sent to that virtual router.

Figure 5:
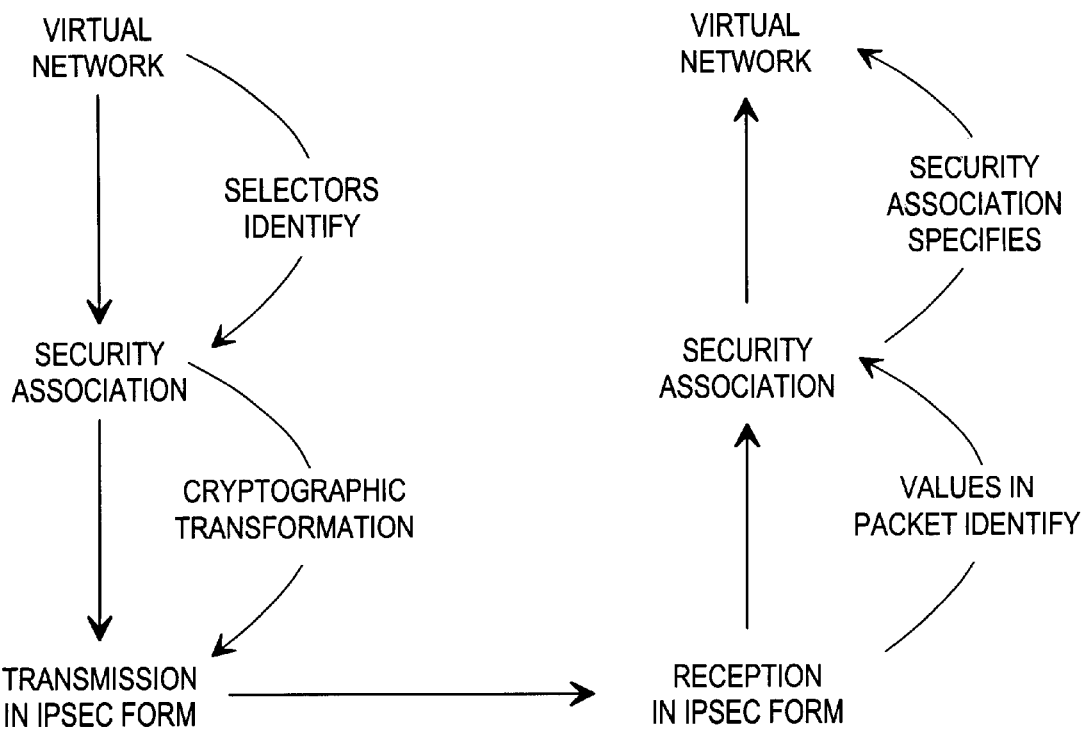
FIG. 5 illustrates the principle of an advantageous embodiment of the invention.

To summarize the operation of the system of FIG. 4, we may look at the conceptual diagram of FIG. 5. Within the transmitting device the selectors associated with a packet identify the packet as belonging to a certain virtual network, whereby the transmitting device knows to process the packet according to the correct security association. In the receiving device the values contained within the header(s) of the packet tell to the receiving device, which security association it belongs to, and the security association further specifies the correct virtual network.

This invention is easily extended to encompass any security protocol that supports the concept of security associations, identified by selectors (such as network source or destination addresses) at the sending end and packet contents at the receiving end. Even though the invention was described in the context of the IPSEC protocol, it can be applied to other protocols such as Simple Key Manager for Internet Protocol SKIP, and a number of older protocols.

Even though the invention was described in the context of tunnels between two physical routers (endpoints), it can equally well be applied in the case of tunnels between more than two physical routers (e.g., when secure multicasts or broadcast transmissions are used for communication between the routers).

It should be noted that the concept of virtual networks is not limited to operation between traditional routers but can extend to hosts as well. For the purposes of this invention, IPSEC tunnels are not limited to the AH/ESP tunnel mode. The IPSEC AH/ESP transport mode can be used for this purpose as well, as it associates packets with a security association. Use of transport mode typically only makes sense between hosts.

Figure 6:
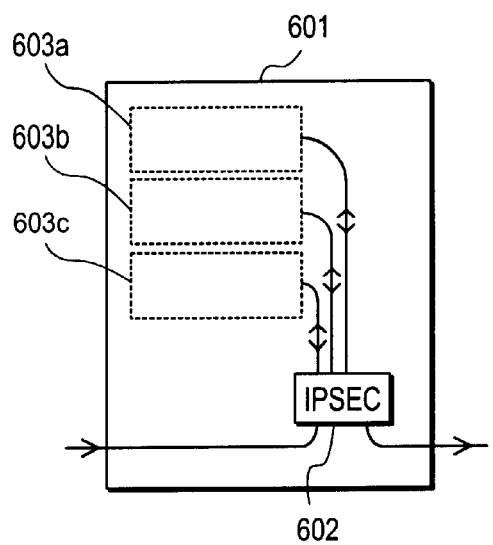
FIGS. 6 and 7 illustrate some architectures applicable in the context of the invention.
Figure 7:
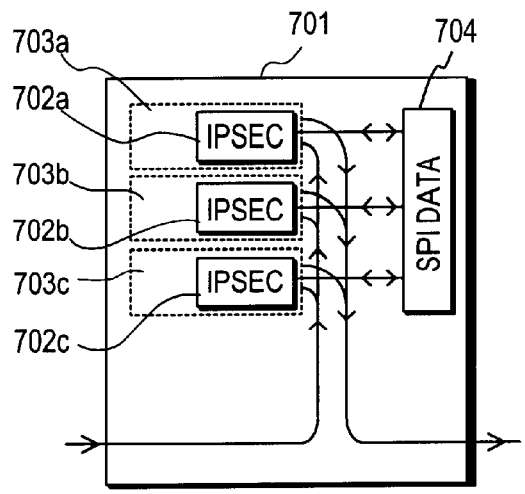

There are several possible architectures for implementing the present invention, in particular with respect to the selection of the SPI values. Some of these architectures are illustrated in FIGS. 6 and 7. Firstly, according to FIG. 6, it is possible to have in each physical computer device 601 only a single module 602 performing IPSEC processing, and to have e.g. all virtual routers 603*a*, 603*b* and 603*c* in a physical router share the same IPSEC module. In an alternative architecture according to FIG. 7 each virtual router 703*a*, 703*b* and 703*c* can have its own IPSEC processor 702*a*, 702*b* and 702*c*, but the different processors have a shared data structure 704 that they use for allocating SPI values (either by actually having a single store for SAs or SPIs, or by checking the SPIs used by every other virtual router before allocating an SPI value). In a third alternative architecture the range of possible SPI values may be partitioned so that the virtual router identifier is encoded into the SPI value (either in a fixed number of bits, or using any suitable arithmetic coding method to combine a virtual network identifier and a SPI index). Variations and intermediate forms of these architectures can also be used. When there are multiple IPSEC processing modules, and the SPI can be used to identify the IPSEC processing module, no explicit virtual network identifiers are needed. Likewise, when a set of security associations is associated with each virtual router, the virtual router identifier does not need to be used explicitly as a selector, even though it is implicitly involved. These cases are also within the scope of the present invention.

Besides negotiating the virtual network identifier as a selector, it is also possible to negotiate a special transformation (e.g., a variation of the standard AH/ESP transforms) that includes the virtual network identifier as part of the transformed packet. For example, the virtual network identifier could be stored in the first bytes of the payload (before the actual tunneled packet), in the padding bytes of an AH or ESP transformation, in the initialization vector of an ESP transformation, as part of the payload of a custom transformation, or in an IP option (in either an inner or an outer IP header). Many other possible locations for storing it are also possible. It is advantageous to have all potential information referring to a virtual network in the packet encrypted so that only the correct receiving device is able to decrypt it. It is also possible to explicitly store the virtual network identifier only when it changes, and use the same identifier for following packets until a new identifier is encountered, or use any other methods for passing parts of tunneled packets implicitly by context as outlined earlier. The identifier is still considered to be passed in each packet if such implicit methods are used. If the information identifying the transmitting virtual router and the receiving virtual router is somehow transmitted within a data packet, its presence in the data packet may be detectable by analysing the contents of the data packet only; an alternative is to indicate within the security association the presence of such information in the data packet.

What is claimed is:

1. A method for communicating data packets across a non secure network which does not support virtual networks between a transmitting virtual router implemented in trans- mitting computer device which is a node on one of a plurality of virtual networks sharing a network at a transmitting location, and a receiving virtual router implemented in a receiving computer device which is a node on one of a plurality of virtual networks sharing a network at a receiving location, the method comprising the steps of a) establishing a secure tunnel for at least one of said plurality of virtual networks, each said secure tunnel so established for transmitting data packets for said one virtual network across said non secure network which does not support virtual networks, each said secure tunnel so established being set up by establishing a security association for the secure transmission of data packets between said transmitting computer device and said receiving computer device using any secure tunneling protocol for which a security association can be established, and agreeing upon and recording elements of said security association as a set of selectors in a memory or database in each of said transmitting and receiving computers, said selectors including at least one additional selector which directly or indirectly identifies said one virtual network which said secure tunnel serves and thereby also identifying a transmitting virtual router which supplies data packets to be transmitted via said secure tunnel and a receiving virtual router to which data packets are to be routed at said receiving computer device, (b) in the transmitting computer device, using the identification of the transmitting virtual router in the transmitting computer device from which a packet arrives to select the proper security association associated with a secure tunnel over said non secure tunnel which serves the virtual network of which said transmitting virtual router is a part, and using said selected security association for processing the data packet to encrypt at least a portion of said packet and add a header which includes information which identifies the security association to be used to process said packet at said receiving computer device, and transmitting said encrypted packet over said non secure network using the secure tunnel established by negotiation of said security association used to process said packet, (c) in the receiving computer device, selecting the security association for processing a data packet coming from the transmitting computer device on the basis of conventional security association selection processing using predetermined security association selector values contained within the data packet header, and using said security association to decrypt said packet, and (d) in the receiving computer device, reading said at least one additional selector added to said security association selected in step (c) which said at least one additional selector directly or indirectly identifies the receiving virtual router to which said packet is to be directed, and using said at least one additional selector to route said data packet to receiving virtual router so identified and which is part of a virtual network containing a computer or other device to which said packet is addressed.

2. A method according to claim 1, further comprising between steps c) and d) the step of performing a certain transform on the data packet to be transmitted to achieve tunneling between the transmitting computer device and the receiving computer device.

3. A method according to claim 2, wherein said transform is the IPSEC AH transform.

4. A method according to claim 2, wherein said transform is the IPSEC ESP transform.

5. A method according to claim 1, wherein step a) includes the step of using a virtual network identifier to indirectly identify the transmitting virtual router and the receiving virtual router within said security association by adding said virtual network identifier as a selector to said security association.

6. A method according to claim 1, wherein step a) includes the step of adding to each said security association a transmitting virtual router identifier and a receiving virtual router identifier to directly identify transmitting virtual router and the receiving virtual router within the virtual network served by a tunnel set up by establishment of said security association.

7. A method according to claim 1, wherein step a) comprises using the IKE protocol for establishing a security association between said transmitting computer device and said receiving computer device for each said tunnel to be created and creating at least one tunnel for each virtual network at the location of said transmitting computer to be coupled to another virtual network at the location of said receiving computer, and adding to each security association so established either a virtual network identifier selector identifying the virtual network which the tunnel established by said security association serves or adding to each security association selectors which give the transmitting virtual router identifier and the receiving virtual router identifier which are part of a virtual network which a tunnel established by said security association serves.

8. A method according to claim 7, wherein the use of the IKE protocol comprises the step of exchanging the information identifying the transmitting virtual router and the receiving virtual router between the transmitting computer device and the receiving computer device as part of the IKE phase 2 identity payloads.

9. A method for communicating data packets between one of a plurality of transmitting virtual routers in a transmitting computer device, each transmitting virtual router being part of a different virtual network sharing a physical network at the location of said transmitting computer device and one of a plurality of receiving virtual routers in a receiving computer device, each receiving virtual router being part of a different virtual network sharing a physical network at the location of said receiving computer device, said communicating of data packets taking place across a non secure data path which does not support virtual networks, the method comprising the steps of
  a) establishing a security association for the secure transmission of data packets between the transmitting computer device and the receiving computer device for at least said virtual network to which said transmitting virtual router and said receiving virtual router belong, each said security association establishing a secure data path across said non secure data path which does not support virtual networks for one said virtual network, said secure data path carrying only packet traffic belonging to said virtual network to which said secure data path is dedicated,
  b) for each said security association so established, adding selector data thereto identifying a transmitting virtual router and a receiving virtual router which are part of the virtual network to be served by said secure data path established by said security association,
  c) in said transmitting computer device, using the identification of the transmitting virtual router within the transmitting computer device from which a packet arrives for transmission in the selection of the security association for processing said data packet, and transmitting said data packet across said secure data path established by said security association and dedicated to carrying packet traffic for the virtual network of which said transmitting virtual router is a part,
  d) in said receiving computer device, selecting the appropriate security association with which to process each data packet coming from said transmitting computer device on the basis of values contained within a header of said data packet, and
  e) in said receiving computer device, determining to which virtual network each data packet received belongs and to which virtual router to send said packet using a selector stored during step b) above in the security association selected in step d) above, and directing each said data packet processed using said security association selected in step d) above to a receiving virtual router selected on the basis of a selector within said security association;
and further comprising the steps of
  inserting said selector information identifying the transmitting virtual router and the receiving virtual router for each said security association into a data packet to be transmitted from the transmitting computer device to the receiving computer device, and
  indicating within said security association to which said selector information applies the presence of said information in the data packet.

10. A method according to claim 1, additionally comprising the step of inserting the information identifying the transmitting virtual router and the receiving virtual router into a data packet to be transmitted from the transmitting computer device to the receiving computer device so that its presence in the data packet is detectable in the receiving computer by analysing the contents of the data packet.

11. A method for transmitting data packets from a transmitting virtual router which forms part of one of a plurality of virtual networks which shares a physical network coupled to a transmitting device to a particular one of a plurality of virtual networks which share a physical network at a receiving location, said transmitting virtual router being implemented in said transmitting computer device, said transmission occurring across a non secure network which does not support virtual networks to a receiving computer device, the method comprising the steps of:
  a) establishing a secure tunnel data path across said non secure network for at least the one of said plurality of virtual networks to which said transmitting virtual router belongs, said non secure network being one which does not support virtual networks, said establishment of said secure tunnel data path implemented by establishing for at least said virtual network to which said transmitting virtual router belongs a security association that defines said secure tunnel data path across said non secure network, said secure tunnel data path being established for the secure transmission of data packets of said virtual network to which said transmitting virtual router belongs between said transmitting computer device and said receiving computer device across said non secure network,
  b) for at least the virtual network to which said transmitting virtual router belong and for which a security association was established, identifying said transmitting virtual router which forms part of said virtual network corresponding to said security association by storing data within said security association which identifies said transmitting virtual router, and
  c) in said transmitting computer device, using the identification of the transmitting virtual router within the transmitting computer device from which a packet arrives for transmission across said non secure network in the selection of the corresponding security association which establishes said secure tunnel data path which is dedicated to carrying traffic for the virtual network of which said transmitting virtual router is a part and using said security association for processing said data packet coming from said transmitting virtual router.

12. A method for receiving data packets transmitted by a transmitting virtual router which is part of one of a plurality of virtual networks which share a physical network at the location of and coupled to a transmitting computer device, said packets transmitted over a non secure data path which does not support virtual networks through a secure tunnel dedicated to transmitting only packets from the virtual network of which said transmitting virtual router is a part to a receiving virtual router which is part of one of a plurality of virtual networks sharing a physical network at the location of and coupled to a receiving computer device, said receiving virtual router being one of a plurality of virtual routers implemented by said receiving computer device, each of said virtual routers implemented by said receiving computer device being part of a different one of said plurality of virtual networks sharing a physical network at the location of and coupled to said receiving computer device in execution in said receiving computer device, the method comprising the steps of
  a) establishing at least one said secure tunnel through said non secure data path which does not support virtual networks for at least the one of said plurality of logical networks to which said transmitting and receiving virtual routers belong by establishing a security association for each said secure tunnel, said security association defining the characteristics of said tunnel for the secure transmission of data packets between said transmitting computer device and said receiving computer device, each said secure tunnel so established dedicated to carrying data packets for only one of said virtual networks, b) including data identifying said transmitting virtual router and said receiving virtual router within said security association that defines the characteristics of said secure tunnel through which are transmitted said packets belonging to said virtual network of which said transmitting virtual router and said receiving virtual router are a part, c) in said receiving computer device, selecting said security association which defines the characteristics of said secure tunnel through which said packets are transmitted by reading information from each said packet, and using said selected security association for processing each data packet coming through said tunnel, and d) in said receiving computer device, directing each data packet processed according to said security association selected in step c) to said receiving virtual router on the basis of the identification of said receiving virtual router within the security association used to process each said data packet.

13. An apparatus for securely transmitting data packets from a transmitting virtual router to a receiving virtual router over a non secure data path, comprising:

a transmitting computer device;

a receiving computer device;

a plurality of virtual routers implemented in said transmitting and receiving computer devices, said plurality of virtual routers including a transmitting virtual router and a receiving virtual router on the same virtual network, each of said plurality of virtual routers each being part of at least one of a plurality of virtual networks which include the virtual network which includes said transmitting virtual router and said receiving virtual router, means for establishing a security association establishing the characteristics of a secure tunnel for the secure transmission of data packets between said transmitting computer device and said receiving computer device via a non secure data path, means for directly or indirectly identifying said transmitting virtual router and said receiving virtual router to be used in transmitting said data packets between said transmitting computer device and said receiving computer device via said secure tunnel by adding data to said security association which identifies said transmitting and receiving virtual routers or at least said virtual network of which they are a part such that said secure tunnel carries only data packets belonging to said virtual network of which said transmitting and receiving virtual routers are a part, and means for using said data in said security association which identifies said transmitting and receiving virtual routers or at least said virtual network of which they are a part to route packets into said secure tunnel which serves to couple said transmitting virtual router to said receiving virtual router and for selecting a security association based upon the identity of the secure tunnel through which data packets arrived at said receiving computer device and using data in said selected security association to route packets received at said receiving computer device via the secure tunnel defined by said selected security association to said receiving virtual router coupled to the virtual network served by said secure tunnel.

14. An apparatus for selecting the proper secure tunnel across a non secure network to use in transmitting data packets from a transmitting virtual router forming part of a virtual network which is one of a plurality of virtual networks at a transmitting location to a receiving virtual router which forms part of a virtual network at a receiving location which is intended to carry data traffic at said receiving location which comes from or is to be sent to said virtual network at said transmitting location of which said transmitting virtual router is a part, comprising:

a transmitting computer device coupled to a physical network at a transmitting location, said network being shared by a plurality of virtual networks, each carrying different traffic, said transmitting computer device for coupling to a non secure network which does not support virtual networks, said non secure network also being coupled to a receiving computer device which implements at a receiving location a plurality of receiving virtual routers each of which is part of a different virtual network at said receiving location, each virtual network at said receiving location for carrying data from or sending data to a corresponding one of said virtual networks at said transmitting location;

a plurality of transmitting virtual routers implemented in said transmitting computer device, each of said plurality of transmitting virtual routers coupled to one of said plurality of virtual networks at said transmitting location which share said physical network coupled to said transmitting computer device, means for establishing a security association establishing the characteristics of a secure tunnel across said non secure network for the secure transmission of data packets from one of said virtual networks at said transmitting location to a corresponding one of said virtual networks at said receiving location, said secure tunnel coupling a transmitting virtual router at said transmitting location to a receiving virtual router at said receiving location, and for adding additional data to said security association that directly or indirectly identifies said transmitting virtual router and/or said virtual network to which said transmitting virtual router is coupled, and means for controlling said transmitting computer device to use the identity of the transmitting virtual router from which data is received for transmission to a destination device on a virtual network at said receiving location to route packets into the proper secure tunnel which couples said transmitting virtual router to a receiving virtual router which is coupled to said virtual network at said receiving location which is coupled to said destination device.

15. An apparatus for securely receiving data packets from a transmitting virtual router on a virtual network at a transmitting location and transmitted over a non secure data path that does not support virtual networks via a secure tunnel and routing said packets to a receiving virtual router on a virtual network at a receiving location that corresponds to said virtual network from which said data packets originated, comprising:

a receiving computer device for coupling to said non secure network which does not support virtual networks and coupled to a physical network;

a plurality of virtual routers implemented in said receiving computer device, each of said plurality of virtual routers coupled to a different one or a plurality of virtual networks at the location of said receiving computer device, each of said virtual networks at the location of said receiving computer device sharing said physical network to which said receiving computer device is coupled, at least one of said virtual networks at the location of said receiving computer device being coupled to a receiving virtual router and hereafter called the receiving virtual network, said receiving virtual network corresponding to and for carrying data of a virtual network hereafter called a transmitting virtual network which is one of a plurality of virtual networks at the location of a transmitting computer device, said data being transmitted from said transmitting virtual network by a transmitting virtual router coupled thereto, means for negotiating a security association establishing the characteristics of secure tunnel for the secure transmission of data packets from said transmitting virtual router to said receiving virtual router via said non secure network, said security association resulting in a set of selectors to be used for said secure transmission, means for adding to said security association one or more additional selectors to directly or indirectly identify the virtual network and/or said receiving virtual router to which said data passing through said secure tunnel is to be routed by said receiving computer device, and means for determining through which secure tunnel data arriving at said receiving computer device passed and looking up the security association that defines said secure tunnel and using said one or more additional selectors added to said security association to route packets to said receiving virtual router so that they can be routed onto said receiving virtual network.

16. An article of manufacture comprising:

a computer usable medium having computer readable code segments embodied thereon for implementing routing across a non secure network which does not support virtual networks, the computer readable program code segments comprising:

a first computer readable program code segment for controlling a transmitting computer device at a transmitting location to implement a first plurality of virtual routers including at least one transmitting virtual router which is part of a transmitting virtual network which is one of a plurality of virtual networks at said transmitting location, each said virtual network including at least one of said first plurality of virtual routers;

a second computer readable program code segment for controlling a receiving computer device to implement a plurality of virtual routers including a receiving virtual router which is part of a receiving virtual network which is one of a plurality of virtual networks at said receiving location;

a third computer readable program code segment for controlling said transmitting and receiving computer devices to negotiate one or more security associations, each said security association defining a secure tunnel data path to link a virtual network at said transmitting location to a virtual network at said receiving location through a non secure network which does not support virtual networks, at least one said security association being negotiated to implement a secure tunnel data path to couple said receiving virtual network to said transmitting virtual network, said third computer readable program code segment for adding additional selector data to each said security association so negotiated that directly or indirectly identifies the virtual networks and/or virtual routers which are linked by each said secure tunnel data path;

a fourth computer readable program code segment for controlling said transmitting computer device to receive data packets from said transmitting virtual router for transmission across said non secure data network and to use the identification of said transmitting virtual router to determine the security association to use in processing said data packet, and for transmitting said data packet via a secure tunnel data path which was established by said security association; and a fifth computer readable program code segment for controlling said receiving computer device to receive data packets transmitted across said non secure data path via one or more of said secure tunnel data paths and to route each said data packets to the appropriate receiving virtual router by selecting a security association for each said data packets on the basis of the secure tunnel data path through which said data packet travelled and to use said additional selector data which was added to the selected security association to identify the appropriate receiving virtual router to which to route the packet.

* * * * *